US008712414B2

(12) United States Patent
Somasundaram et al.

(10) Patent No.: US 8,712,414 B2
(45) Date of Patent: Apr. 29, 2014

(54) CELL RESELECTION AND HANDOVER WITH MULTIMEDIA BROADCAST/MULTICAST SERVICE

(75) Inventors: Shankar Somasundaram, Deer Park, NY (US); Mohammed Sammour, Montreal (CA); Rajat P. Mukherjee, Montreal (CA); Ulises Olvera-Hernandez, Kirkland (CA); Jin Wang, Central Islip, NY (US); James M. Miller, Verona, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 1058 days.

(21) Appl. No.: 12/109,492

(22) Filed: Apr. 25, 2008

(65) Prior Publication Data
US 2008/0287129 A1 Nov. 20, 2008

Related U.S. Application Data

(60) Provisional application No. 60/915,030, filed on Apr. 30, 2007, provisional application No. 60/944,548, filed on Jun. 18, 2007.

(51) Int. Cl.
*H04W 36/00* (2009.01)
(52) U.S. Cl.
USPC .......................................... 455/436; 370/331
(58) Field of Classification Search
USPC .......................................................... 455/436
See application file for complete search history.

(56) References Cited

U.S. PATENT DOCUMENTS

| 5,905,950 | A | 5/1999 | Anell |
| 7,047,016 | B2 | 5/2006 | Walton et al. |
| 2004/0058684 | A1* | 3/2004 | Charles ..................... 455/450 |
| 2004/0085926 | A1 | 5/2004 | Hwang et al. |

(Continued)

FOREIGN PATENT DOCUMENTS

| EP | 0776588 | 6/1997 |
| EP | 1 509 056 | 2/2005 |

(Continued)

OTHER PUBLICATIONS

Orange, "Text Proposal for MBMS Service Continuity When Moving Between SFN and Non-SFN Zones", 3GPP TSG-RAN WG3 #55bis, R3-070712, (Malta, Mar. 27-30, 2007).

(Continued)

*Primary Examiner* — George Eng
*Assistant Examiner* — Joseph Dean, Jr.
(74) *Attorney, Agent, or Firm* — Julian F. Santos

(57) ABSTRACT

A method and apparatus for providing wireless communication services, (e.g., multimedia broadcast multicast services (MBMS)), are disclosed. A wireless transmit/receive unit (WTRU) detects a plurality of target cell evolved Node-Bs (eNodeBs) that neighbor a serving cell eNodeB. The WTRU evaluates cell reselection criteria and determines a neighboring target cell eNodeB to reselect. The WTRU receives and reads master information block (MIB) and system information messages of the neighboring target cell eNodeB, and confirms that the determined neighboring target cell eNodeB is not part of a multimedia broadcast single frequency network (MBSFN). The WTRU identifies the neighboring target cell eNodeB to the serving cell eNodeB. The WTRU then receives and reads MIB messages of the neighboring target cell eNodeB again to determine whether the system information has changed and, if so, the WTRU reads the system information and reselects to the neighboring target cell eNodeB, which provides the wireless communication services.

36 Claims, 7 Drawing Sheets

(56) References Cited

U.S. PATENT DOCUMENTS

| | | | |
|---|---|---|---|
| 2004/0157600 | A1 | 8/2004 | Stumpert et al. |
| 2004/0202140 | A1 | 10/2004 | Kim et al. |
| 2005/0043049 | A1 | 2/2005 | Demir et al. |
| 2005/0101326 | A1* | 5/2005 | Kang et al. ............... 455/436 |
| 2006/0035662 | A1* | 2/2006 | Jeong et al. ............... 455/525 |
| 2006/0058034 | A1 | 3/2006 | Vaittinen et al. |
| 2006/0072532 | A1* | 4/2006 | Dorenbosch et al. ......... 370/342 |
| 2006/0084443 | A1 | 4/2006 | Yeo et al. |
| 2006/0221888 | A1 | 10/2006 | Sebire et al. |
| 2006/0251019 | A1 | 11/2006 | Dalsgaard et al. |
| 2006/0251023 | A1 | 11/2006 | Choi |
| 2007/0047493 | A1* | 3/2007 | Park et al. ............... 370/331 |
| 2007/0140173 | A1 | 6/2007 | Tomizu |
| 2007/0168555 | A1* | 7/2007 | Dorenbosch ............... 709/245 |
| 2008/0212546 | A1* | 9/2008 | Fischer ............... 370/338 |
| 2010/0278161 | A1 | 11/2010 | Ore et al. |
| 2011/0305184 | A1 | 12/2011 | Hsu |

FOREIGN PATENT DOCUMENTS

| | | |
|---|---|---|
| EP | 1 467 586 | 11/2006 |
| JP | 2004-135292 | 4/2004 |
| JP | 2004-312750 | 11/2004 |
| JP | 2006-339820 | 12/2006 |
| JP | 2008-538667 | 10/2008 |
| RU | 2288538 C2 | 5/2001 |
| WO | 96/06512 | 2/1996 |
| WO | 00/67511 | 11/2000 |
| WO | WO-2004/017580 A1 | 2/2004 |
| WO | 2005/101886 | 10/2005 |
| WO | WO-2006/030308 A2 | 3/2006 |
| WO | 2006/096036 | 9/2006 |
| WO | 2008/054668 | 5/2008 |

OTHER PUBLICATIONS

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.0.0 (Mar. 2007).

Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.4.0 (Mar. 2008).

Drafting Group, "Drivers for Mobility Control Between LTE And GERAN", 3GPP Workshop LTE GSM Handover, LGW-070034, (Sophia Antipolis, France, Jan. 10-11, 2007).

Ericsson, 'Overview of RRM Measurements in E-UTRAN', 3GPP TSG-RAN WG4 (Radio) Meeting #41, R4-061158, (Riga, Estonia, Nov. 6 10, 2006).

Huawei, "Consideration on Cell Reselection", 3GPP TSG RAN WG2 #56, R2-063146, (Riga, Latvia, Nov. 6-10, 2006).

Nokia, "New Drivers for Cell Reselection Procedures in LTE", 3GPP TSG-RAN WG2 #55, R2-062899, (Seoul, Korea, Oct. 9-13, 2006).

RAN WG2 Chairman, "Drivers for LTE Mobility Control", 3GPP Workshop LTE GSM Handovers, LGW 070026, (Sophia Antipolis, France, Jan. 10-11, 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300 V0.5.0 (Feb. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300 V8.3.0 (Dec. 2007).

U.S. Appl. No. 12/047,786, filed Mar. 13, 2008.

"Official Notice of Rejection (English Translation), mailed Aug. 20, 2013", Japanese Patent Application No. 2012-091189, 4 pages.

"Official Notice of Rejection, mailed Aug. 20, 2013", Japanese Patent Application No. 2012-091189, 3 pages.

* cited by examiner

US 8,712,414 B2

CELL RESELECTION AND HANDOVER WITH MULTIMEDIA BROADCAST/MULTICAST SERVICE

CROSS REFERENCE TO RELATED APPLICATIONS

This application claims the benefit of U.S. Provisional Application No. 60/915,030 filed Apr. 30, 2007 and U.S. Provisional Application No. 60/944,548 filed Jun. 18, 2007, which are incorporated by reference as if fully set forth.

FIELD OF INVENTION

This application is related to wireless communications.

BACKGROUND

One of the main problems when a wireless transmit/receive unit (WTRU) is receiving multimedia broadcast multicast services (MBMS) is maintaining the service continuity and minimizing the delay during handover and cell reselection. Furthermore, the service continuity must be maintained and the delay must be minimized when the WTRU moves across from a multimedia broadcast single frequency network (MBSFN) service area to a non-MBSFN service area, but within the same MBMS service area.

Different steps that need to be considered when an idle mode WTRU receiving an MBMS transmission in an MBSFN service area approaches the border of the MBSFN service area, have been raised. The steps include: 1) detect that the WTRU is approaching the border of the MBSFN service area; 2) move to active mode; and 3) request the reception of the MBMS service in single cell mode point-to-point (PTP). The target cell evolved Node-B (eNodeB) also has to check whether the requested service is available or not and, if not, 4) join the multicast distribution tree for the MBMS service; and 5) finally start providing MBMS data to the WTRU in single cell mode.

While a few high level system solutions have been suggested, a more integrated solution that would help minimize delay and maintain the service continuity is needed. Accordingly, it is desirable to enhance the transit from a non-MBSFN area to another non-MBSFN service area or to an MBSFN service area, as well as reselection from an MBSFN service area to a non-MBSFN service area.

SUMMARY

A method and apparatus for providing wireless communication services, (e.g., MBMS), are disclosed. A WTRU detects a plurality of target cell eNodeBs that neighbor a serving cell eNodeB. The WTRU evaluates cell reselection criteria and determines a neighboring target cell eNodeB to reselect. The WTRU receives and reads master information block (MIB) and system information messages of the neighboring target cell eNodeB, and confirms that the determined neighboring target cell eNodeB is not part of an MBSFN. The WTRU indicates the determined neighboring target cell eNodeB to the serving cell eNodeB. The WTRU then receives and reads MIB messages of the neighboring target cell eNodeB again to determine whether the system information has changed and, if so, the WTRU reads the system information and reselects to the neighboring target cell eNodeB. The WTRU then sends a cell update message with capability information and service requirements to the neighboring target cell eNodeB, which in turn sends a cell update confirmation message to the WTRU indicating that the target cell eNodeB is ready to start providing the wireless communication services.

BRIEF DESCRIPTION OF THE DRAWINGS

A more detailed understanding of the invention may be had from the following description, given by way of example and to be understood in conjunction with the accompanying drawings wherein.

DETAILED DESCRIPTION

Figure 1A:
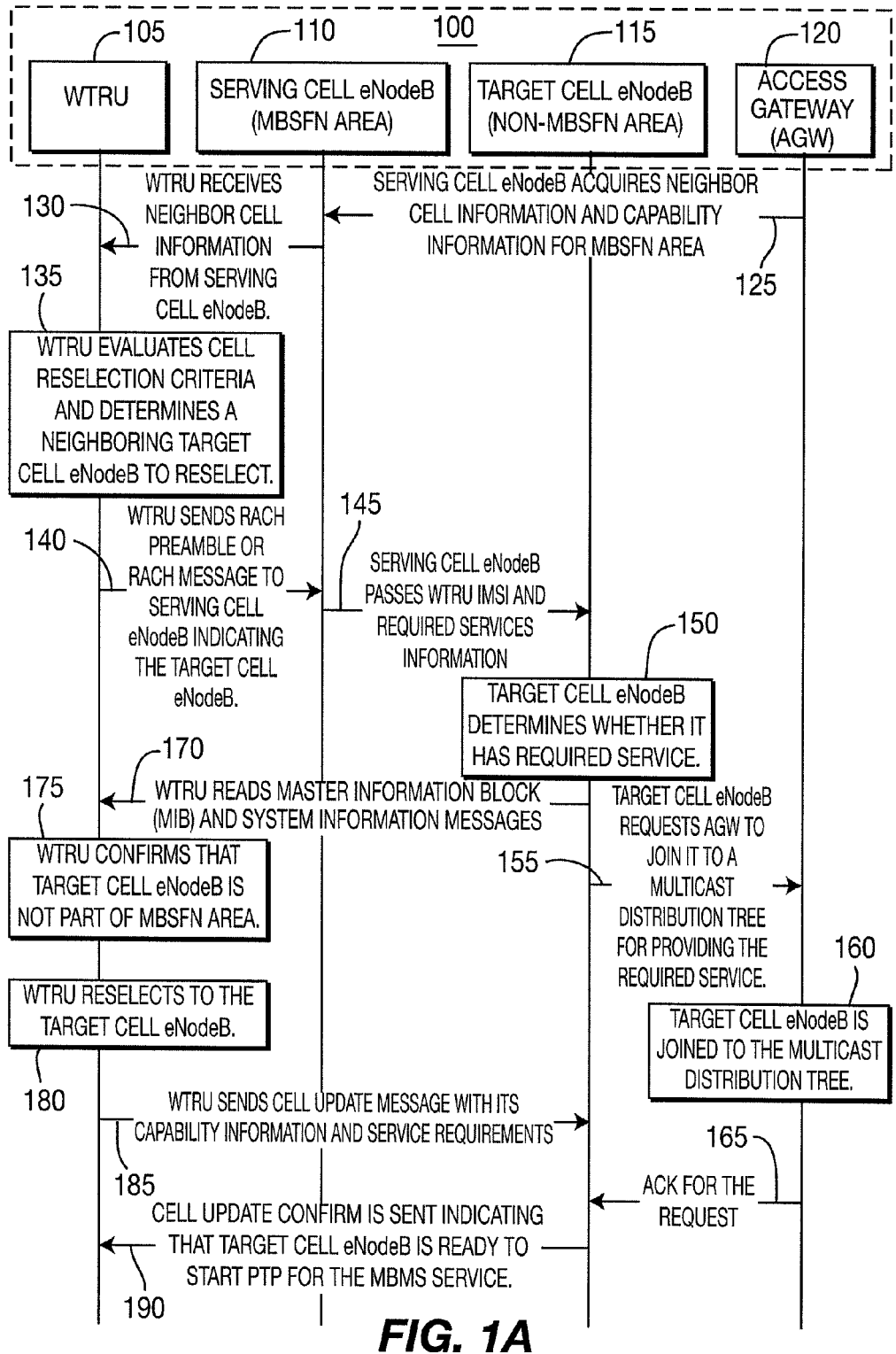
FIG. 1A is a signal flow diagram that shows a cell reselection from an MBSFN cell to a non-MBSFN cell in which a WTRU receives neighbor cell information from a serving cell eNodeB.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

In the current work group (WG) radio access network 2 (RAN2), there is much debate as to whether a neighbor cell list might be needed for cell reselection. While a neighbor cell list is not considered mandatory for cell reselection, it is still uncertain if there is a need to indicate specific intra-frequency neighboring cells to improve performance of their detection. This principle of being able to signal specific intra-frequency neighboring cells is used to improve MBMS service continuity performance. There are also cases and scenarios in which the neighbor list is not being transmitted by the serving cell.

This application will cover two scenarios, each for cell reselection and handover cases with MBMS services ongoing. For both scenarios, it is assumed that the WTRU is camped on a cell in the MBSFN area before the reselection procedure begins.

Cell Reselection

When a neighbor cell identity (ID) list information is transmitted by a serving cell eNodeB, the capability information of the neighbor MBMS cells may or may not be transmitted by the serving cell to save on resources.

At the border of the MBSFN areas, the neighbor cells should be signaled along with an indicator (one bit or more) signaling whether those neighbor cells are part of the MBSFN area, MBSFN guard area or non-MBSFN area. Thus, the border eNodeBs need to be configured with this information. Alternatively each of the eNodeBs could find information about its neighbor cells from an access gateway (AGW), which should contain the information when the MBSFN area is configured. Alternatively the eNodeBs could also request the neighboring cell capability information periodically from the AGW to take care of any updates or changes in the MBSFN area.

Also knowing the neighbor cell information, the serving cell could figure out that it is a border cell and through its broadcast messages still indicate that it is a border/edge cell of the MBSFN area. Thus, only eNodeBs in the edge of an MBSFN area would be involved and the WTRU would expect that the cell it may reselect to may be part of the MBSFN guard area or a part of the non-MBSFN area and could potentially use this information to make its reselection and handover procedures more robust.

A WTRU which is at the edge of such a MBSFN cell would thus have the list of the neighbor cells and the capability information for each of those cells.

In such a scenario when it does a cell reselection procedure it would first give weight to those cells at the edge which are part of the MBSFN area. If it does not find any such cell, it would then give priority to those cells which are part of the MBSFN guard area. Finally, it would try and reselect to a cell from the non-MBSFN area based on cell reselection procedures, such as those disclosed in commonly assigned U.S. Provisional Application 60/894,588, filed on Mar. 13, 2007, which is incorporated by reference as if fully set forth. The WTRU knowing its own service requirements would not reselect to those cells (if any) which are not part of the MBSFN area nor are part of the MBMS service area. In case the network would like to control the reselection procedure, (e.g., it may not want the WTRU not to reselect to any particular cell due to cell loading or other reasons), it can indicate a very high offset for that (a particular) cell or include a neighbor cell blacklist or probably even a white list with only certain neighbors.

Handover

In a first handover scenario, a normal handover occurs where the WTRU is in active state and performs a normal WTRU controlled handover to a target cell eNodeB. If the WTRU wants to handover to a cell in a non-MBSFN area, the WTRU capabilities and requirements could be passed in the handover request message from the serving cell eNodeB to the target cell eNodeB, which would then have the time to join the multicast distribution tree and prepare for a PTP MBMS service. If the target cell eNodeB is not in such a position, it could reject the handover request and the WTRU would have an opportunity to handover to a different target cell eNodeB.

In a second handover scenario, a network directed handover occurs where either the WTRU could be in the idle state, and then transition to an active state once it detects that the serving cell eNodeB it is camped on is a border MBSFN cell, and send its measurements to the network, or the WTRU could already be in an active state. Based on the measurements sent, the network could direct the WTRU to handover to a particular target cell eNodeB providing the required service.

As mentioned before, the WTRU could initially be in an idle state, but then contact the target cell eNodeB and transition to an active state by establishing a radio resource control (RRC) connection with the serving cell eNodeB, when it detects that it is in a border cell of the MBSFN area, in accordance with one of the first and second handover scenarios, (e.g., the target cell eNodeB or reading SIBs), or via an explicit indicator that is broadcast that indicates that the serving cell eNodeB lies in the border of the MBSFN area. RRC connection establishment messages may be enhanced to indicate that the WTRU is currently receiving MBMS traffic.

Once the WTRU transitions to an active state or for a WTRU already in the active state, the WTRU may send measurement reports to the network indicating the signal quality it observes. Once the serving cell eNodeB is made aware of the presence (or measurements) of the WTRU, the serving cell eNodeB monitors the measurements from the WTRU, and decides whether to command/redirect the WTRU to another cell where it can get the PTP MBMS services.

If the serving cell eNodeB decides to command/redirect the WTRU to another cell, (i.e., target cell eNodeB), where it can the PTP MBMS services, the serving cell eNodeB contacts the target cell eNodeB sending it the appropriate parameters to prepare for the MBMS PTP service. The target eNodeB prepares the MBMS PTP service for the WTRU, and sends a signal confirming so back to the serving cell eNodeB. The serving cell eNodeB then commands/redirects the WTRU to access the target eNodeB. The WTRU accesses the target eNodeB it was commanded to access, and receives the MBMS PTP service.

Furthermore, the cell reselection or handover procedures may be further hastened by not repeating the generic bootstrapping procedure for MBMS on every cell. For this, the WTRU would need to store the key Ks and other pertinent security information for not only the serving cell, but also for the last few camped cells. This could also be left as implementation option for the WTRU.

Next described are methods whereby the TA concept may be used to facilitate MBMS service continuity. Note that these methods may be used either in conjunction with or independent of the methods to ensure MBMS service continuity that were previously described in this document.

Design and Use of Tracking Areas to Facilitate MBMS Service Continuity

Tracking areas (TAs) are designed such that a MBSFN cell that is at the edge of the MBSFN area, (i.e., the border cell), will belong to a TA which is different than the tracking areas for the non-border cells, (i.e., the inner cells), of the MBSFN area.

Similarly, TAs are designed such that a cell that is in the MBSFN guard area will belong to a TA which is different than the tracking areas for the cells belonging to MBSFN area. Upon moving into a border cell of the MBSFN area, or into a cell in the guard MBSFN area, the WTRU will trigger a TA update message (since it will be moving into another TA, by design).

The TA update message may include an indication of whether the WTRU is receiving MBMS services, the type of MBMS service it is receiving, (PTP or MBSFN), and/or any other configuration parameters or context information related to the MBMS service.

Alternatively to sending the above TAU information, only information that has changed from current MBMS service may be included so that the eNodeB can be informed and prepare in advance. Otherwise, there is no need to repeat the information without change to eNodeB again. This can save uplink signaling overhead.

When the WTRU is inside the edge cell, one alternative to send TAU message is to only include critical information such as WTRU being currently at edge cell, or maybe mobility or trajectory trend (serving eNodeB can know if WTRU is still moving out of MBSFN area or may be lingering inside the MBSFN area). This information is sufficient for the serving cell eNodeB to know in advance if handover preparation needs to be triggered or not. The uplink signaling overhead can thus be minimized.

A measurement report may be sent along with the TA update, or at any time after the WTRU moves into the cell. This measurement report would a report that is sent after the handover is done and is used by the edge cell for future handovers. Upon receiving the TA update, (with the optional indication or context information of MBMS services being used by the WTRU), the eNodeB will execute the switch from SFN MBMS services to PTP MBMS services. For example, if the eNodeB is in the MBSFN guard area, the eNodeB will establish PTP MBMS services first, by paging the WTRU which in turn will request an RRC connection, and the setup procedure continues from there on. If the eNodeB is in the MBSFN border area, the eNodeB will request the preparation of the MBMS resources from a suitable target cell eNodeB, (e.g., based on WTRU measurement reports and other admission criteria), and then command/redirect the WTRU to the target cell eNodeB, similar to what has been previously described for the other scenarios/cases of this document.

In the current WG RAN2, there is much debate as to whether a neighbor list may be needed for cell reselection. It is under study if there is a need to indicate specific intra-frequency neighboring cells to improve performance of their detection. Therefore, this principle of being able to signal specific intra-frequency neighboring cells to improve MBMS service continuity performance may be utilized. Cases and scenarios without the neighbor list being transmitted by the serving cell may also be considered.

This application is directed to the handover and reselection to and from an MBSFN and a non-MBSFN area. In all cases, the WTRU depends on the network to transmit some information about the neighbor cell capabilities either through the broadcast message or some dedicated RRC signaling message in the serving cell or the target cell. Before handover, the WTRU tries and informs the target cell either through the serving cell or by directly transmitting a message in the target about the services it requires, giving the target cell the opportunity to prepare for the reselection or handover procedure.

FIG. 1A is a signal flow diagram that shows a cell reselection scenario in a wireless communication system 100 including a WTRU 105, a serving cell eNodeB (MBSFN area) 110, a target, (i.e., neighbor), cell eNodeB (non-MBSFN area) 115 and an AGW 120. The WTRU 105 moves from the serving cell eNodeB 110 in an MBSFN area to the target cell eNodeB 115 in a non-MBSFN area.

In the cell reselection scenario of FIG. 1A, neighbor cell information, (e.g., a neighbor cell list), and capability information for MBMS cells in an MBSFN area, is transmitted by the AGW 120 to the serving cell eNodeB 110 (step 125). Alternatively, the serving cell eNodeB 110 may be preconfigured with the neighbor cell information, (e.g., a neighbor cell list), and capability information for MBMS cells in an MBSFN area, such as via a periodic message. The serving cell eNodeB 110 then transmits neighbor cell information to the WTRU 105 (step 130). In step 135, the WTRU 105 evaluates cell reselection criteria and determines a neighboring target cell to reselect. Before it starts the reselection procedure, the WTRU 105 first sends a random access channel (RACH) preamble or RACH message to the current serving cell eNodeB 110 it is camped on (step 140), indicating the neighbor cell it is planning to reselect, (i.e., the target cell eNodeB 115).

Also, if possible, dedicated signatures may be reserved for this purpose to minimize the cell reselection interruption time. In step 145, the serving cell eNodeB 110 sends a signal to the target cell eNodeB 115 including the ID, (e.g., international mobile subscriber identity (IMSI), temporary mobile subscriber identity (TMSI)), of the WTRU 105 and indicating that the WTRU 105 requires a PTP MBMS service.

Still referring to FIG. 1A, in step 150, the target cell eNodeB 115 determines whether it has the required PTP MBMS service available. If not, the target cell eNodeB 115 sends a signal to the AGW 120 requesting that the AGW 120 join the target cell eNodeB 115 to a multicast distribution tree for providing the required service (step 155), whereby the AGW 120 provides MBMS information to the target cell eNodeB 115, which in turn provides the MBMS information to the WTRU 105. After the AGW 120 joins the target cell eNodeB 115 to the multicast distribution tree (step 160), the AGW 120 may signal an explicit positive acknowledgement (ACK) to the target cell eNodeB 115 (step 165), or this can be assumed implicitly through no signalling. If the target cell eNodeB 115 is not joined to the multicast distribution tree, then the WTRU 105 would be appropriately informed.

Alternatively, the WTRU 105 could, along with indicating, to the serving cell eNodeB 110, the target cell eNodeB 115 that it is going to camp on, also send neighbor cell capability information to the serving cell eNodeB 110. The serving cell eNodeB 110, knowing the service capabilities of the target cell eNodeB 115, may determine whether the target cell eNodeB 115 is capable of providing the PTP MBS service and, if not, the serving cell eNodeB 110 may forward the WTRU ID along with the services required to the target cell eNodeB 115.

Alternatively the WTRU 105 may just send a message to the current serving cell eNodeB 110 it is camped on, indicating the target cell eNodeB 115 it is planning to reselect as mentioned before. The serving cell eNodeB 110 could have information of the target cell eNodeB 115 from the network, and thus knowing the service capabilities of the target cell eNodeB 115, the serving cell eNodeB 110 may determine whether the target cell eNodeB 115 is capable of providing the service and, if not, the serving cell eNodeB 110 may forward the WTRU ID along with the services required to the target cell eNodeB 115. After sending a signal to the serving cell eNodeB 110, the WTRU 105 starts the reselection procedure to the cell in a non-MBSFN area.

Each cell in an MBMS service area transmits MIB and system information messages at a periodic rate. The MIB and system information messages include information indicating whether the cell is part of an MBSFN area or whether the cell only supports a PTP service. Thus, when the WTRU 105 reads the MIB and system information messages that are transmitted by the target cell eNodeB 115 (step 170), the WTRU 105 can confirm that the new cell it is planning to reselect is not part of an MBSFN area (step 175). Alternatively, only a cell in the MBMS PTP area or the MBSFN area can transmit the information as to whether the cell is part of the MBSFN area or not. Once the WTRU 105 has finishes reading the MIB and system information messages (step 170), the WTRU 105 reselects to the target cell eNodeB 115 (step 180) and sends a cell update message to the target cell eNodeB 115 indicating its TMSI or some other ID, its own capabilities and its requirements for a PTP MBMS service (step 185).

The target cell eNodeB 115, having been pre-informed of the requirements of the WTRU 105, should be capable of supporting the MBMS PTP service and confirming this support by transmitting a cell update confirm message to the WTRU 105. If the target cell eNodeB 115 is not able to join the multicast distribution tree, then it can indicate this to the WTRU 115 in the cell update confirm message (step 190). Thus, the WTRU 105 would have the choice to reselect to another cell which has the capability using its prior information, or initiate another new reselection procedure altogether, but this may introduce additional delays. Alternatively, it is proposed that the target cell eNodeB 115 may redirect the WTRU 105 to another cell eNodeB that is capable of providing the PTP MBMS service. The target cell eNodeB 115 may utilize the latest WTRU measurement report information (if available) in order to select the eNodeB to which the WTRU 105 would be redirected, e.g., the WTRU 115 would send the measurement report when it sent the cell update message, or at any other time.

The above procedures are the same if the WTRU 105 had reselected to a cell in an MBSFN guard area, but the interruption time would be shorter since a cell in the MBSFN guard area would find it easier to join the multicast distribution tree, since it should already be synchronized with the MBSFN network.

Figure 1B:
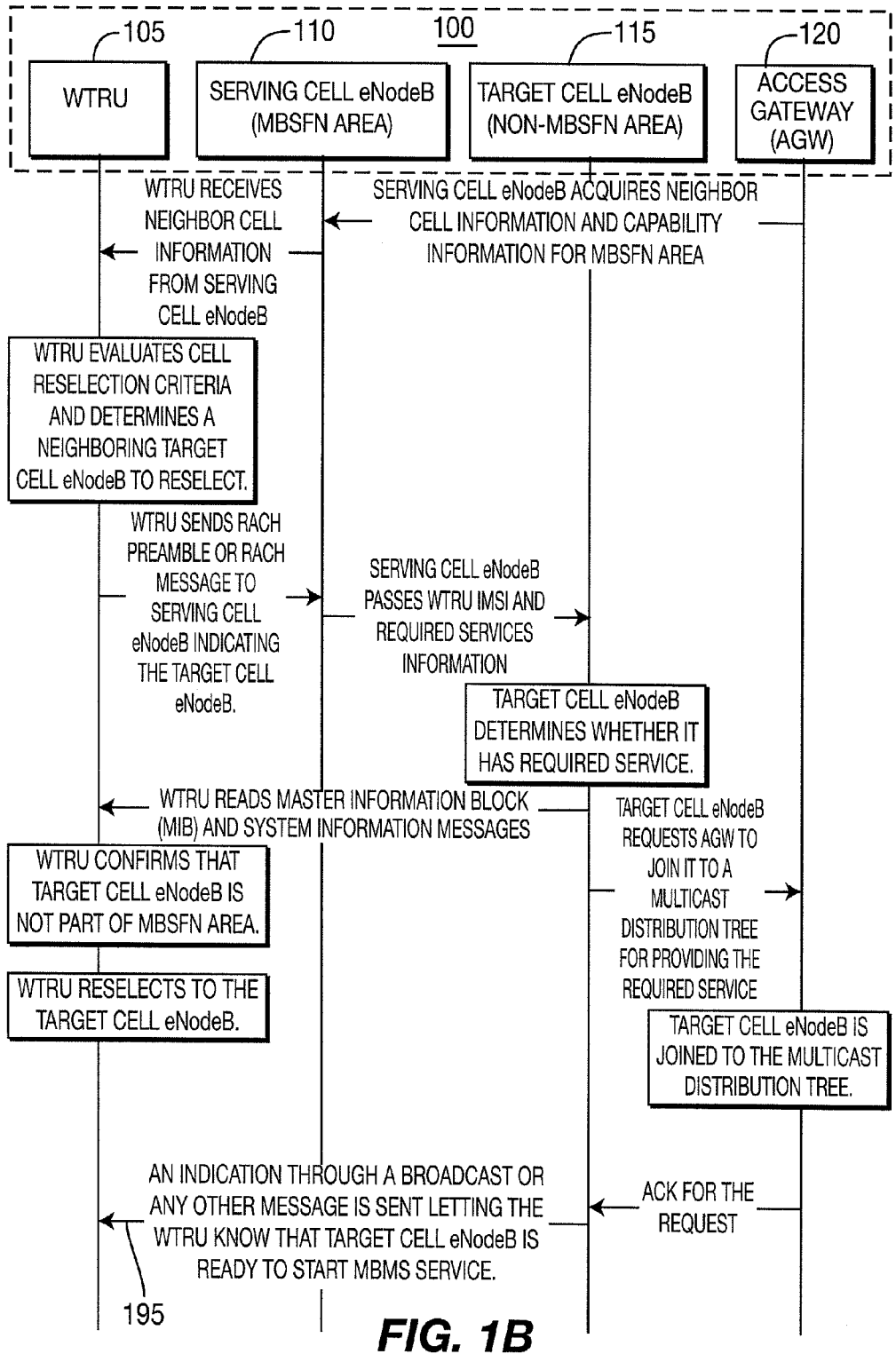
FIG. 1B is a signal diagram similar to FIG. 1A except that an indication through a broadcast or any other message is sent to the WTRU indicating that the target cell eNodeB is ready to start MBMS service.

FIG. 1B is a signal diagram similar to FIG. 1A except that an indication through a broadcast or any other message is sent to the WTRU indicating that the target cell eNodeB is ready to start MBMS service (step 195).

Figure 2A:
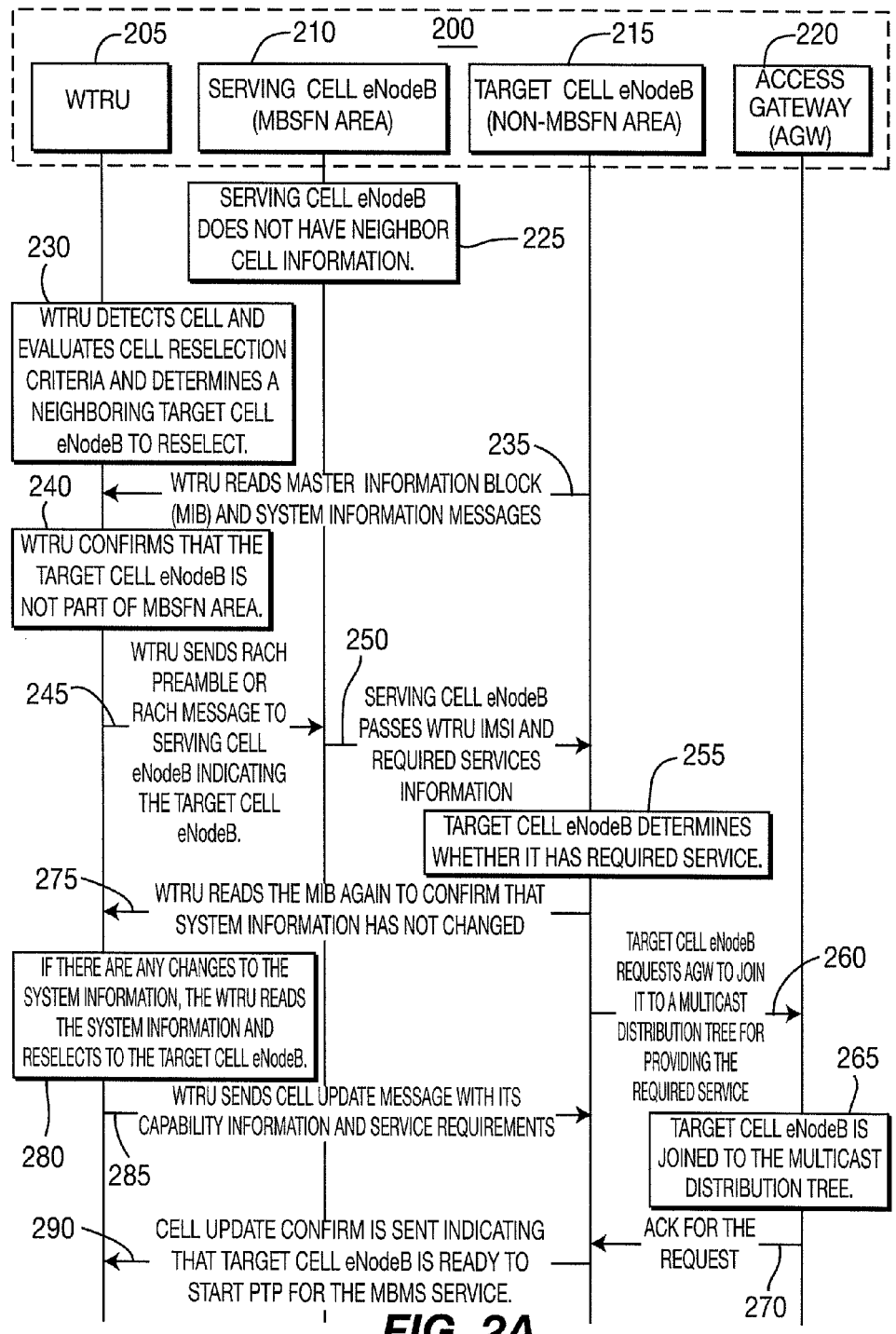
FIG. 2A is a signal flow diagram that shows a cell reselection from an MBSFN cell to a non-MBSFN cell in which in which a WTRU does not receive neighbor cell information from a serving cell eNodeB.

FIG. 2A is a signal flow diagram that shows a cell reselection scenario in a wireless communication system 200 including a WTRU 205, a serving cell eNodeB (MBSFN area) 210, a target, (i.e., neighbor), cell eNodeB (non-MBSFN area) 215 and an AGW 220. The WTRU 205 moves from the serving cell eNodeB 210 in an MBSFN area to the target cell eNodeB 215 in a non-MBSFN area but, unlike the cell reselection scenario of FIG. 2A, the neighbor cell information and capability information for the MBMS cells is not transmitted by the serving cell to the WTRU.

When neighbor cell information, (e.g., a neighbor cell identity (ID) list), is not transmitted, the serving cell eNodeB 210 in the MBSFN area may or may not have the neighbor cell information and capability information. It is first assumed that the serving cell eNodeB 210 does not have any information of the neighbor cells (step 225). In this scenario, the WTRU 205 would not know whether the cell to which it is planning to reselect is part of the MBSFN area or not, and hence the WTRU 205 will have to detect potential neighboring target cell eNodeBs, evaluate cell reselection criteria and, determine a target cell eNodeB 215 to reselect (step 230). Based on its determination, the WTRU 205 will have to proceed with reading the MIB and system information messages (step 235).

Alternatively, even if the neighbor cell information is not provided, the serving cell eNodeB 210 could still indicate through its broadcast messages if it is a border/edge cell of the MBSFN area. Thus, the WTRU 205 would expect that the target cell eNodeB 215 it might reselect to may be part of the MBSFN guard area or a part of the non-MBSFN area.

It is still proposed though that all the cells in a MBMS service area should transmit the information as to whether it is part of a MBSFN area, MBSFN Guard Area or whether it only supports a PTP service in its system information messages. Thus, when the WTRU 205 reads the system information messages that are transmitted by target cell eNodeB 215, the WTRU 205 confirms that the new cell, (i.e., target cell eNodeB 215), that it is planning to reselect is not part of the MBSFN area (step 240). Alternatively, only a cell in the MBMS PTP area or the MBSFN area can transmit the information indicating whether the cell is part of the MBSFN area or not.

In step 245, the WTRU 205 first sends a random access channel (RACH) preamble or RACH message to the current serving cell eNodeB 110 it is camped on (step 245), indicating the neighbor cell it is planning to reselect, (i.e., the target cell eNodeB 115). Also, if possible, dedicated signatures may be reserved for this purpose to minimize the cell reselection interruption time. In step 250, the serving cell eNodeB 210 sends a signal to the target cell eNodeB 215 including the ID, (e.g., international mobile subscriber identity (IMSI), temporary mobile subscriber identity (TMSI)), of the WTRU 205 and indicating that the WTRU 205 requires a PTP MBMS service.

Still referring to FIG. 2A, in step 255, the target cell eNodeB 215 determines whether it has the required PTP MBMS service. If not, the target cell eNodeB 215 sends a signal to the AGW 220 requesting that the AGW 220 join the target cell eNodeB 215 to a multicast distribution tree for providing the service (step 260). After the AGW 220 joins the target cell eNodeB 215 to the multicast distribution tree (step 265), the AGW 220 may signal an explicit positive acknowledgement (ACK) to the target cell eNodeB 215 (step 270), or this can be assumed implicitly through no signaling. If the target cell eNodeB 215 is not joined to the multicast distribution tree, then the WTRU 205 would be appropriately informed.

Alternatively, the WTRU 205 could, along with indicating, to the serving cell eNodeB 210, the target cell eNodeB 215 that it is going to camp on, also send neighbor cell capability information to the serving cell eNodeB 210. The serving cell eNodeB 210, knowing the service capabilities of the target cell eNodeB 215, may determine whether the target cell eNodeB 215 is capable of providing the PTP MBS service and, if not, the serving cell eNodeB 210 may forward the WTRU ID along with the services required to the target cell eNodeB 215.

Alternatively, the WTRU 205 may just send a message to the current serving cell eNodeB 210 it is camped on, indicating the target cell eNodeB 215 it is planning to reselect as mentioned before. The serving cell eNodeB 210 could have information of the target cell eNodeB 215 from the network, and thus knowing the service capabilities of the target cell eNodeB 215, the serving cell eNodeB 110 may determine whether the target cell eNodeB 215 is capable of providing the service and, if not, the serving cell eNodeB 210 may forward the WTRU ID along with the services required to the target cell eNodeB 215. After sending a signal to the serving cell eNodeB 210, the WTRU 205 starts the reselection procedure to the cell in a non-MBSFN area.

In step 275, the WTRU 205 then reads the MIB messages again to confirm that the system information has not changed since the last reading (step 275). This may be required since by sending a message to serving cell eNodeB 210 (steps 245 and 250) after reading the system information messages received from the target cell eNodeB 215, there is a slight time gap introduced between the reading of the MIB and system information messages, and the sending the cell update message. However, since it is highly likely that the system information messages would not have changed since the last reading, the slight delay introduced should not be a problem. Hence the WTRU 205 should not face much delay in reselection. If there are any changes to the system information, the WTRU reads the system information messages and reselects to the target cell eNodeB (step 280).

Once the WTRU 205 has finished reading the system information messages, the WTRU 205 can send a cell update message to the target cell eNodeB 215 indicating its TMSI or some other ID, its own capabilities and its requirements for a PTP MBMS service (step 285).

The target cell eNodeB 215, having been pre-informed of the requirements of the WTRU 205, should be capable of supporting the MBMS PTP service and confirming this support by transmitting a cell update confirm message to the WTRU 205 (step 290). If the target cell eNodeB 215 is not able to join the multicast distribution tree, the target cell eNodeB 215 can request the packets from the serving cell eNodeB 210, and the serving cell eNodeB 210 could forward the MBMS packets to the target cell eNodeB 215. The target cell eNodeB 215 could then forward them to the WTRU 205 until it joins the multicast distribution tree.

Alternatively, even if the target cell eNodeB 215 has not joined the multicast distribution tree, it could wait till it has joined the tree, proceed with the cell update confirm message informing the WTRU 205 that the MBMS service would resume within some period of time and then resume the service when finally it has required MBMS service. This option though could increase the amount of delay.

Alternatively, it is proposed that the target cell eNodeB 215 may redirect the WTRU 205 to another cell eNodeB that is capable of providing the PTP MBMS service. The target cell eNodeB 215 may utilize the latest WTRU measurement report information (if available) in order to decide on the cell eNodeB to which the WTRU 215 would be redirected, e.g., the WTRU 215 would send the measurement report when it sent the cell update message, or at any other time.

The above procedures of the second reselection scenario are the same if the WTRU 215 had reselected to a cell in a MBSFN guard area, but the interruption time should reduce since a cell in the MBSFN guard area should find it easier to join the multicast distribution tree since it should already be synchronized with the MBSFN network.

Other than the two scenarios mentioned above, there could be "intermediate scenarios" such as the serving cell eNodeB 210 having the capability information of the neighbor cells, but not transmitting this information and, instead, only transmitting the neighbor ID list to save on resources. In this scenario, if the capability information of neighbor MBMS cells is not transmitted by the serving cell eNode B 210, then the WTRU 205 may have to read the system information to understand whether the neighbor cell provides the requisite service and the procedure might be similar as mentioned before in the second scenario.

The overall procedure though could be faster or better controlled than in the second scenario since this neighbor ID list can act as a white list mentioning only the cells which the WTRU 205 is allowed to camp on thereby giving the serving cell eNodeB 210 more control over the reselection procedure, and the serving cell eNodeB 210 could exert some control on the reselection procedures. For example, preference may be given to some neighbor cells or redirecting to some cells through cell specific reselection parameters, such as those described in U.S. Provisional application 60/894,588, since it has knowledge of the neighboring cell capabilities.

The serving cell eNodeB 210 has the capability information and ID list of the neighbor cells, but does not transmit the information to save on resources. In this scenario if the capability information and ID list of neighbor MBMS cells is known but not transmitted by the serving cell eNodeB 210, then the WTRU 205 may have to detect the target cell eNodeB 215 and read the system information to understand whether the target cell eNodeB 215 provides the requisite service. The procedure then may be similar as mentioned before in the second scenario.

The overall procedure though could be faster or better controlled than in second scenario since knowing the neighbor information can help the serving cell realize it is the border/edge cell of the MBSFN area which it could then indicate through its broadcast messages. Thus the WTRU 205 would expect that the cell it might reselect to might be part of the MBSFN guard area or a part of the non-MBSFN area and could potentially use this information to make its reselection and handover procedures more robust.

Figure 2B:
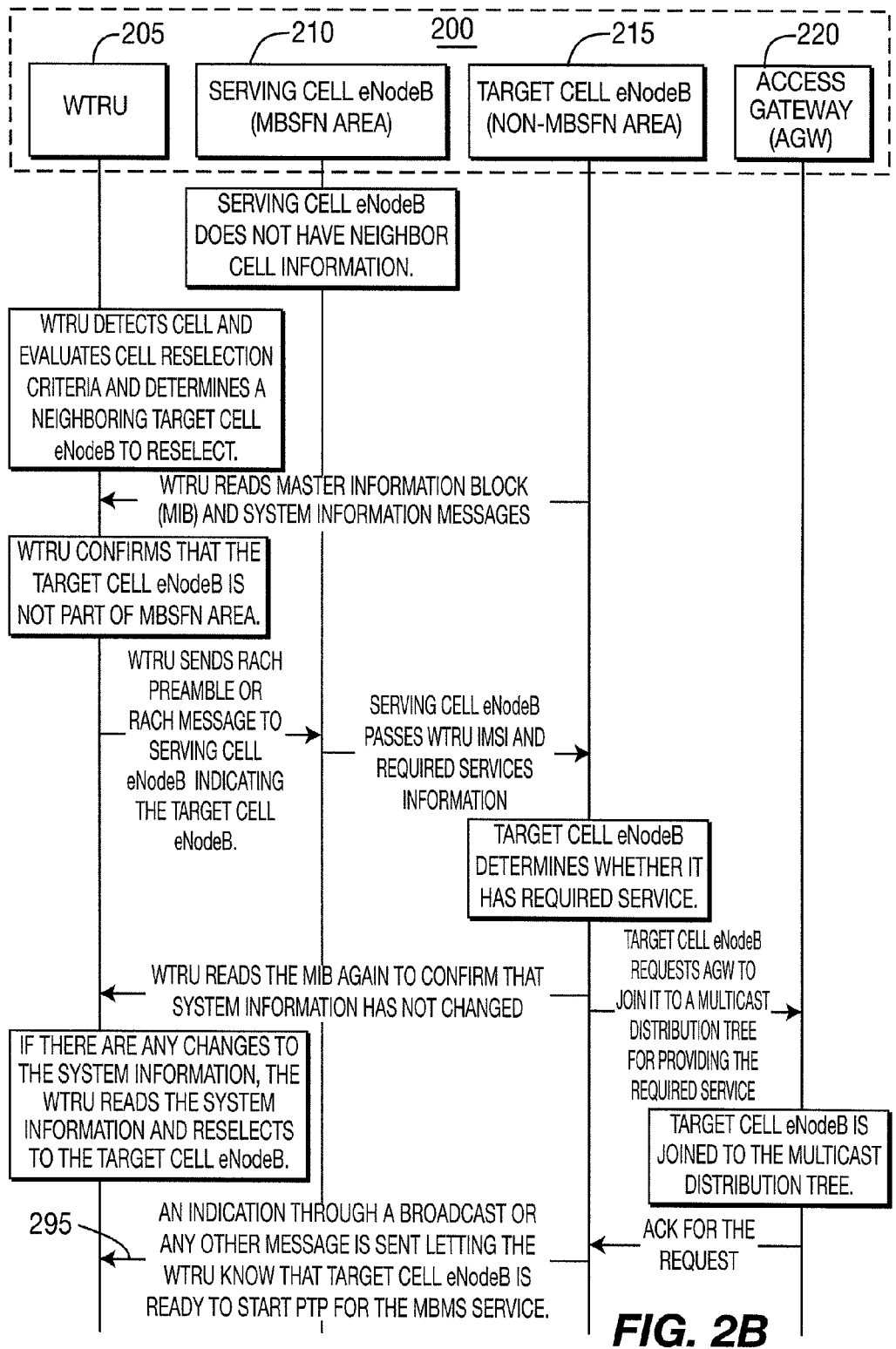
FIG. 2B is a signal diagram similar to FIG. 2A except that an indication through a broadcast or any other message is sent to the WTRU indicating that the target cell eNodeB is ready to start MBMS service.

FIG. 2B is a signal diagram similar to FIG. 2A except that an indication through a broadcast or any other message is sent to the WTRU indicating that the target cell eNodeB is ready to start MBMS service (step 295).

Figure 3A:
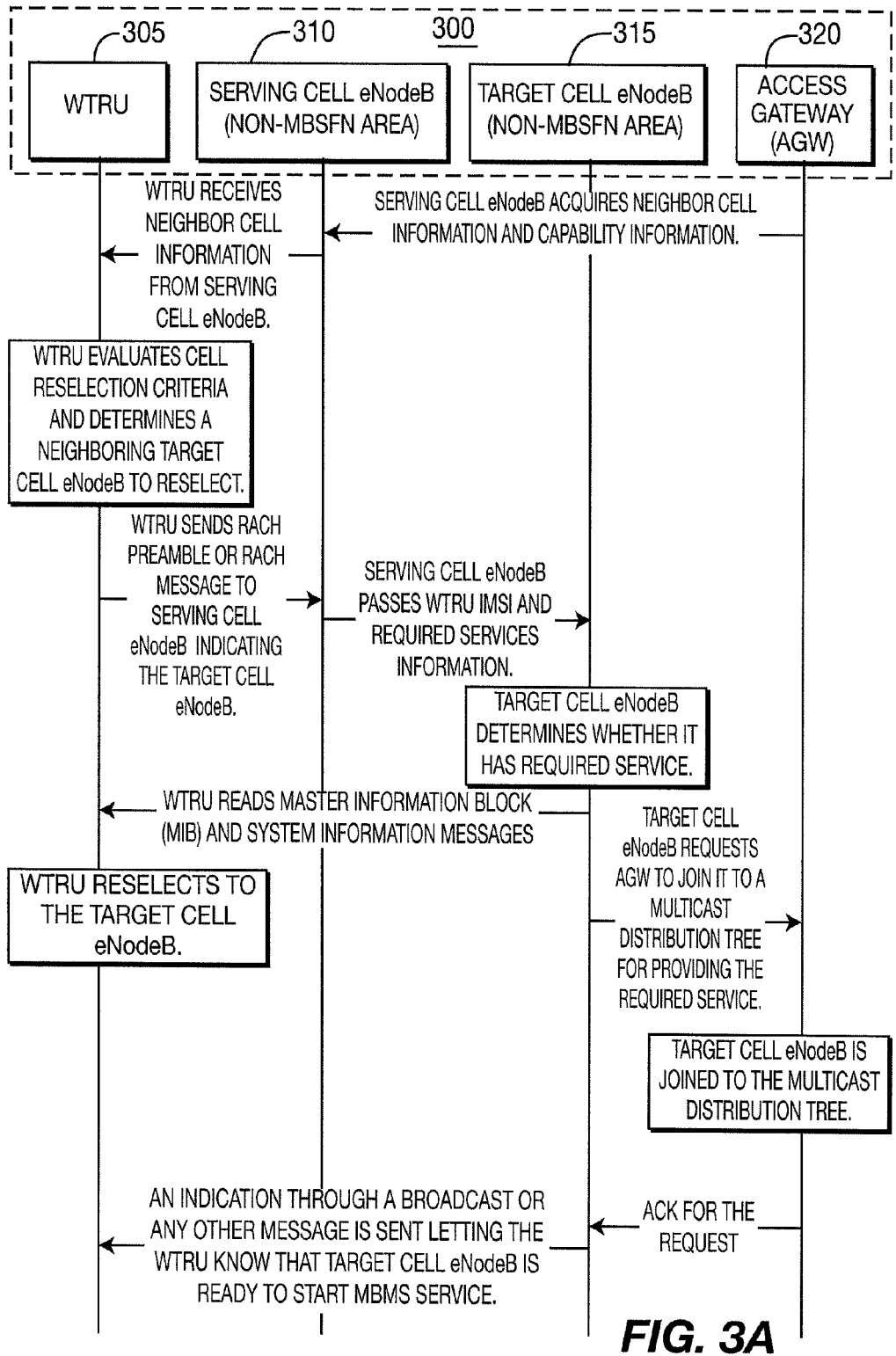
FIG. 3A is an exemplary signal diagram showing a WTRU moving from a non-MBSFN cell to a non-MBSFN cell where a neighbor list for MBMS cells is transmitted by a serving cell.

FIG. 3A shows a wireless communication system 300 including a WTRU 305, a serving cell eNodeB (non-MBSFN area) 310, a target, (i.e., neighbor), cell eNodeB (non-MBSFN area) 315 and an AGW 320. The WTRU 305 moves from one non-MBSFN area cell to another non-MBSFN area cell, where neighbor cell information and capability information is transmitted by the non-MBSFN serving cell.

Figure 3B:
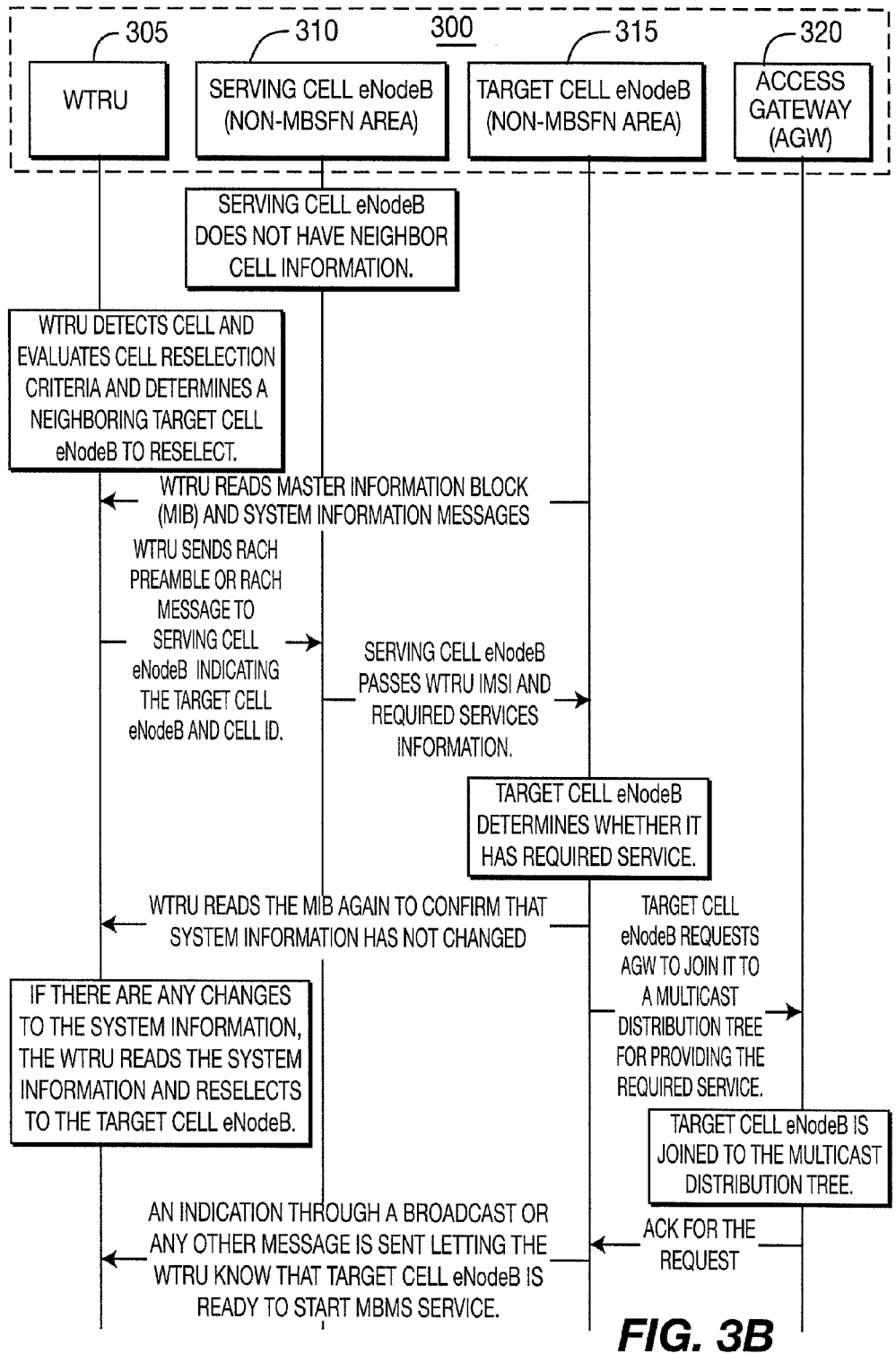
FIG. 3B is an exemplary signal diagram showing a WTRU moving from a non-MBSFN cell to a non-MBSFN cell where a neighbor list for MBMS cells is not transmitted by a serving cell.

FIG. 3B is a signal diagram similar to FIG. 3A except that the neighbor cell information and capability information for the MBMS cells is not transmitted by the serving cell to the WTRU.

Figure 4:
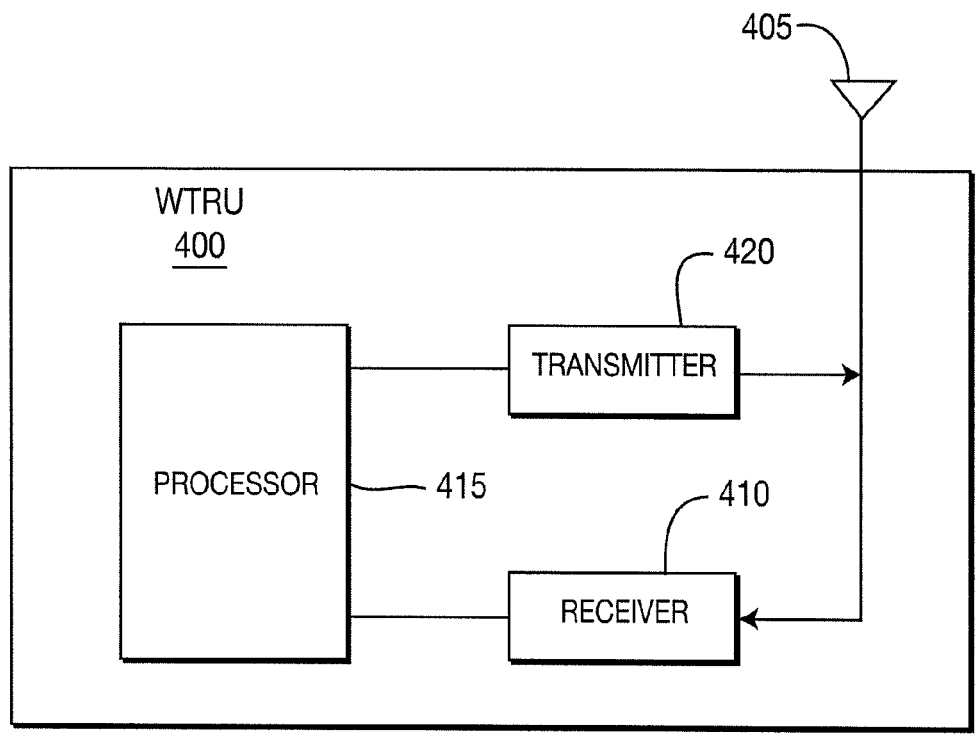
FIG. 4 is a block diagram of a WTRU.

FIG. 4 is a block diagram of a WTRU 400 configured to perform any of the operations performed by the WTRUs 105, 205 and 305. The WTRU 400 includes an antenna 405, a receiver 410, a processor 415 and a transmitter 420.

The receiver 410 is configured to receive cell information associated with target cell eNodeBs that neighbor a serving cell eNodeB. The processor 415 is configured to evaluate cell reselection criteria and determine a neighboring target cell eNodeB to reselect. The transmitter 420 is configured to transmit a RACH preamble or RACH message indicating the neighboring target cell eNodeB. The receiver 410 is further configured to receive and read MIB and system information messages. The processor 415 is further configured to confirm that the determined neighboring target cell eNodeB is not part of a MBSFN.

The transmitter 420 is further configured to transmit a cell update message including capability information and service requirements. The receiver 410 is further configured to receive a cell update confirmation message indicating that the neighboring target cell eNodeB is ready to provide a wireless communication service (e.g., MBMS). The processor 415 is further configured to reselect the neighboring target cell eNodeB, and the receiver 410 is further configured to receive an indication indicating that the neighboring target cell eNodeB is ready to provide a wireless communication service (e.g., MBMS).

Figure 5:
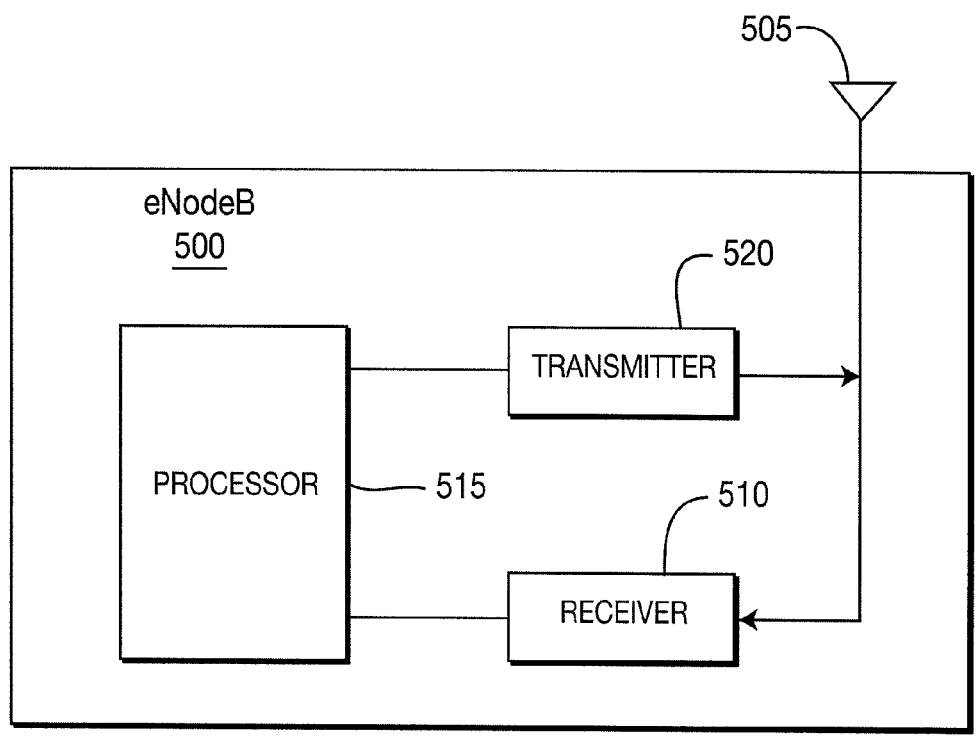
FIG. 5 is a block diagram of an eNodeB.

The processor 415 is further configured to read the MIB messages again to determine whether the received system information has changed, and if it is determined that the system information has changed, the processor 415 reads the system information and reselects to the neighboring target cell eNodeB FIG. 5 is a block diagram of an eNodeB 500 configured to perform any of the operations performed by the eNodeBs 110, 115, 210, 215, 310 and 315. The eNodeB 500 includes an antenna 505, a receiver 510, a processor 515 and a transmitter 520. The eNodeB 500 may be a serving cell eNodeB or a target cell eNodeB.

If the eNodeB 500 in FIG. 5 is a serving cell eNodeB, the receiver 510 is configured to receive cell information associated with target cell eNodeBs for a multimedia broadcast single frequency network (MBSFN) area from an AGW. The transmitter 520 is configured to transmit the received cell information. The receiver 510 is further configured to receive a RACH preamble or RACH message indicating a neighboring target eNodeB. The transmitter 520 is further configured to transmit a signal including the identity of a wireless transmit/receive unit (WTRU) and required services information.

If the eNodeB 500 in FIG. 5 is the neighboring target cell eNodeB that is reselected, the receiver 510 is configured to receive a signal including the identity of a WTRU and required services information, and the processor 515 is configured to determine whether the target cell eNodeB has the required services. The transmitter 520 is configured to transmit MIB and system information messages at a periodic rate, and if the target cell eNodeB does not have the required services, the transmitter 520 transmits a message requesting that the target eNodeB be joined to a multicast distribution tree for providing the required services.

The receiver 510 may be further configured to receive a cell update message including capability information and service requirements, and the transmitter 520 may be further configured to transmit a cell update confirmation message indicating that target cell eNodeB is ready to provide a wireless communication service (e.g., MBMS). The receiver 510 may be further configured to receive a message acknowledging the message requesting that the target cell eNodeB be joined to a multicast distribution tree for providing the required services.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of providing wireless communication services, the method comprising:
    receiving, from a serving cell of an evolved Node-B (eNodeB), cell information associated with target cells of eNodeBs that neighbor the serving cell;
    evaluating, at a wireless transmit and/or receive unit (WTRU), cell reselection criteria including preference given to multimedia broadcast multicast services (MBMS) frequencies the WTRU is currently and/or interested in receiving via a MBMS single frequency network (MBSFN);
    determining, at the WTRU, a neighboring target cell to reselect to based, at least in part, on the preference given to MBMS frequencies the WTRU is currently and/or interested in receiving;
    receiving and reading master information block (MIB) and system information messages of the neighboring target cell;
    transmitting, to the neighboring target cell, a random access channel (RACH) preamble or RACH message;
    receiving a RACH response from the neighboring target cell; and
    receiving, from the neighboring target cell, MBMS including the MBMS previously being received from the serving cell.

2. The method of claim 1, further comprising:
    determining that the neighboring target cell is not ready to provide the MBMS;
    transmitting, to the serving cell, a random access channel (RACH) preamble or RACH message indicating the neighboring target cell prior to reselection;
    transmitting, to the neighboring target cell, a cell update message including capability information and service requirements; and
    receiving, from the neighboring target cell, a cell update confirmation message indicating that the neighboring target cell is ready to provide the MBMS.

3. The method of claim 1, further comprising: reselecting to the neighboring target cell.

4. The method of claim 1, further comprising:
    reselecting to the neighboring target cell; and
    receiving a signal from the neighboring target cell indicating that the neighboring target cell is ready to provide the MBMS.

5. The method of claim 1, wherein determining a neighboring target cell to reselect to comprises: determining the neighboring target cell to reselect to based, at least in part, on the preference given to frequencies of the MBMS frequencies the WTRU is currently and/or interested in receiving.

6. A wireless transmit/receive unit (WTRU) comprising a receiver, processor and a transmitter, wherein:
    the receiver is configured to receive, from a serving cell of an evolved Node-B (eNodeB), cell information associated with target cells of eNodeBs that neighbor the serving cell;
    the processor is configured to:
    evaluate cell reselection criteria including preference given to multimedia broadcast multicast services (MBMS) frequencies the WTRU is currently and/or interested in receiving via a MBMS single frequency network (MBSFN); and
    determine a neighboring target cell to reselect to based, at least in part, on the preference given to MBMS frequencies the WTRU is currently and/or interested in receiving;
    the receiver is configured to receive and read master information block (MIB) and system information messages of the neighboring target cell;
    the transmitter is the transmitter is configured to transmit, to the neighboring target cell eNodeB, a random access channel (RACH) preamble or RACH message; and the receiver is configured to:
receive a RACH response from the neighboring target cell; and
receive, from the neighboring target cell, MBMS including the MBMS previously being received from the serving cell.

7. The WTRU of claim 6, wherein:
the processor is configured to determine that the neighboring target cell is not ready to provide the MBMS;
the transmitter is further configured to:
transmit, to the serving cell, a random access channel (RACH) preamble or RACH message indicating the neighboring target cell prior to reselection, and
transmit, to the neighboring target cell, a cell update message including capability information and service requirements, and
the receiver is configured to receive, from the neighboring target cell, a cell update confirmation message indicating that the neighboring target cell is ready to provide the MBMS.

8. The WTRU of claim 6, wherein the processor is configured to reselect to the neighboring target cell.

9. The WTRU of claim 6, wherein:
the processor is configured to reselect the neighboring target cell; and
the receiver is further configured to receive an indication indicating that the neighboring target cell is ready to provide the MBMS.

10. The WTRU of claim 9, wherein the processor is configured to determine the neighboring target cell to reselect to based, at least in part, on the preference given to frequencies of the MBMS frequencies the WTRU is currently and/or interested in receiving.

11. A method of providing wireless communication services, the method comprising:
receiving neighbor cell information and capability information for a multimedia broadcast multicast services (MBMS) single frequency network (MBSFN);
transmitting, to a wireless transmit/receive unit (WTRU), cell information associated with target cells evolved Node-Bs (eNodeBs) that neighbor a serving cell of an eNodeB, the cell information including multimedia broadcast multicast services (MBMS) frequencies associated with the target cells so as to allow the WTRU to determine a neighboring target cell to reselect to;
receiving, at a given target cell, a random access channel (RACH) preamble or RACH message;
transmitting, to the WTRU, a RACH response from the given target cell; and
transmitting, from the given target cell, MBMS including the MBMS previously being received from the serving cell.

12. A system for providing wireless communication services, wherein:
the system comprises a serving cell of an evolved Node-B (eNodeB) and one or more target cells of eNodeBs;
the serving cell eNodeB comprises:
a receiver configured to receive cell information associated with the target cells for a multimedia broadcast multicast services (MBMS) single frequency network (MBSFN); and
a transmitter configured to transmit, to a wireless transmit/receive unit (WTRU), the received cell information, the cell information including multimedia broadcast multicast services (MBMS) frequencies associated with the target cells so as to allow the WTRU to determine a neighboring target cell to reselect to;
each of the neighboring target cell eNodeBs comprises:
a receiver configured to receive, from the WTRU, a random access channel (RACH) preamble or RACH message; and
a transmitter configured to (i) transmit, to the WTRU, a RACH response, and (ii) transmit MBMS including the MBMS previously being received from the serving cell.

13. A method of providing wireless communication services, the method comprising:
detecting a plurality of target cells of evolved Node-Bs (eNodeBs) that neighbor a serving cell of an eNodeB;
evaluating, at a wireless transmit and/or receive unit (WTRU), cell reselection criteria including preference given to multimedia broadcast multicast services (MBMS) frequencies the WTRU is currently and/or interested in receiving via a MBMS single frequency network (MBSFN);
determining a neighboring target cell to reselect to based, at least in part, on the preference given to MBMS frequencies the WTRU is currently and/or interested in receiving;
receiving and reading master information block (MIB) and system information messages of the neighboring target cell;
transmitting to the neighboring target cell, a random access channel (RACH) preamble or RACH message;
receiving a RACH response from the neighboring target cell; and
receiving, from the neighboring target cell, MBMS including the MBMS previously being received from the serving cell eNodeB.

14. The method of claim 13 further comprising:
determining that the neighboring target cell is not ready to provide the MBMS;
transmitting, to the serving cell, a random access channel (RACH) preamble or RACH message indicating the neighboring target cell prior to reselection;
receiving and reading MIB messages of the neighboring target cell again to determine whether the system information has changed;
if it is determined that the system information has changed, reading the system information and reselecting to the neighboring target cell;
if reselection to the neighboring target cell occurs, transmitting, to the neighboring target cell, a cell update message including capability information and service requirements; and
receiving, from the neighboring target cell, a cell update confirmation message indicating that the neighboring target cell is ready to provide the MBMS.

15. The method of claim 13, further comprising: reselecting to the neighboring target cell.

16. The method of claim 13, further comprising:
if reselection to the neighboring target cell occurs, receiving, from the neighboring target cell, a signal indicating that the neighboring target cell is ready to provide the MBMS.

17. The method of claim 13, wherein determining a neighboring target cell reselect to comprises: determining the neighboring target cell to reselect to based, at least in part, on the preference given to frequencies of the MBMS frequencies the WTRU is currently and/or interested in receiving.

18. A wireless transmit/receive unit (WTRU) comprising:
a receiver configured to detect a plurality of target cells of evolved Node-Bs (eNodeBs) that neighbor a serving cell of an eNodeB;

a processor configured to:
evaluate cell reselection criteria including preference given to multimedia broadcast multicast services (MBMS) frequencies the WTRU is currently and/or interested in receiving via a MBMS single frequency network (MBSFN), and
determine a neighboring target cell to reselect to based, at least in part, on the preference given to MBMS frequencies the WTRU is currently and/or interested in receiving;
the receiver further configured to receive master information block (MIB) and system information messages of the neighboring target cell;
the processor being further configured to read MIB messages of the neighboring target cell;
the transmitter further configured to transmit, to the neighboring target cell, a random access channel (RACH) preamble or RACH message; and
the receiver further configured to:
receive a RACH response from the neighboring target cell; and
receive, from the neighboring target cell, MBMS including the MBMS previously being received from the serving cell.

19. The WTRU of claim 18, wherein:
the processor is configured to determine that the neighboring target cell is not ready to provide the MBMS;
the transmitter is configured to transmit, to the serving cell, a random access channel (RACH) preamble or RACH message indicating the neighboring target cell prior to reselection;
the receiver is configured to receive MIB messages of the neighboring target cell again to determine whether the system information has changed;
the processor is configured to read MIB messages of the neighboring target cell again to determine whether the system information has changed; and
if reselection to the neighboring target cell occurs:
the transmitter is configured to transmit, to the neighboring target cell, a cell update message including capability information and service requirements; and
the receiver is further configured to receive, from the neighboring target cell, a cell update confirmation message indicating that the neighboring target cell is ready to provide the MBMS.

20. The WTRU of claim 19, wherein the processor is configured to reselect to the neighboring target cell.

21. A target cell of an evolved Node-B (eNodeB) for providing wireless communication services, the target-cell eNodeB comprising:
a receiver configured to receive, from a serving cell of an eNodeB, a signal including the identity of a wireless transmit/receive unit (WTRU) and required services information;
a processor configured to determine whether the target cell has the required services; and
a transmitter configured to transmit master information block (MIB) and system information messages, and if when the target cell does not have the required services, the transmitter is further configured to transmit, prior to selection or reselection of the target cell by the WTRU, a first message requesting that the target cell be joined to a multicast distribution tree for providing the required services.

22. The target-cell eNodeB of claim 21 wherein the receiver is further configured to receive, from the WTRU, a cell update message including capability information and service requirements, and the transmitter is further configured to transmit, to the WTRU, a cell update confirmation message indicating that the target cell is ready to provide a wireless communication service.

23. The target-cell eNodeB of claim 22 wherein the wireless communication service is multimedia broadcast multicast services (MBMS).

24. The target-cell eNodeB of claim 22 wherein the receiver is further configured to receive a second message acknowledging the first message requesting that the target cell be joined to a multicast distribution tree for providing the required services.

25. A method of providing service continuity for a wireless transmit and/or receive unit (WTRU), the method comprising:
transmitting, to a serving cell of an evolved Node-B (eNodeB), measurement reports associated with target cells of eNodeBs that neighbor the serving cell;
transmitting, to the serving cell, a radio resource control (RRC) message including an indication of multimedia broadcast multicast services (MBMS) frequencies the WTRU is currently and/or interested in receiving via a MBMS single frequency network (MBSFN);
receiving, from the serving cell, a handover command to handover to a neighboring target cell, the neighboring target cell being selected based, at least in part, on the indication of MBMS the WTRU is currently and/or interested in receiving;
transmitting, to the given target cell, a random access channel (RACH) preamble or RACH message;
receiving a RACH response from the given target cell; and
receiving, from the given target cell, MBMS including the MBMS previously being received from the serving cell.

26. The method of claim 25, wherein the handover command is received by way of an RRC connection reconfiguration message.

27. The method of claim 25, wherein the radio resource control (RRC) message is transmitted responsive to a change in the MBMS the WTRU is interested in receiving.

28. The method of claim 27, wherein the change in the MBMS the WTRU is interested in receiving includes a change to the WTRU being no longer interested in the MBMS frequencies the WTRU is currently receiving.

29. The method of claim 25, wherein the radio resource control (RRC) message is transmitted as part of RRC connection establishment.

30. The method of claim 25, wherein the radio resource control (RRC) message includes an indication of preference given to MBMS over unicast.

31. A wireless transmit and/or receive unit (WTRU) adapted for service continuity, the WTRU comprising a transmitter and receiver, wherein:
the transmitter is configured to:
transmit, to a serving cell of an evolved Node-B (eNodeB), measurement reports associated with target cells of eNodeBs that neighbor the serving cell; and
transmit, to the serving cell, a radio resource control (RRC) message including an indication of multimedia broadcast multicast services (MBMS) frequencies the WTRU is currently and/or interested in receiving via a MBMS single frequency network (MBSFN);
the receiver is configured to receive, from the serving cell, a handover command to handover to a neighboring target cell, the neighboring target cell being selected based, at least in part, on the indication of MBMS the WTRU is currently and/or interested in receiving;

the transmitter is configured to transmit, to the given target cell, a random access channel (RACH) preamble or RACH message;

the receiver is configured to:
  receive a RACH response from the given target cell; and
  receive, from the given target cell, MBMS including the MBMS previously being received from the serving cell.

32. The WTRU of claim 31, wherein the receiver is configured to receive the handover command by way of an RRC connection reconfiguration message.

33. The WTRU of claim 31, wherein the radio resource control (RRC) message is transmitted responsive to a change in the MBMS the WTRU is interested in receiving.

34. The WTRU of claim 33, wherein the change in the MBMS the WTRU is interested in receiving includes a change to the WTRU being no longer interested in the MBMS frequencies the WTRU is currently receiving.

35. The WTRU of claim 31, wherein the radio resource control (RRC) message is transmitted as part of RRC connection establishment.

36. The WTRU of claim 31, wherein the radio resource control (RRC) message includes an indication of preference given to MBMS over unicast

* * * * *

UNITED STATES PATENT AND TRADEMARK OFFICE
CERTIFICATE OF CORRECTION

PATENT NO. : 8,712,414 B2
APPLICATION NO. : 12/109492
DATED : April 29, 2014
INVENTOR(S) : Shankar Somasundaram et al.

It is certified that error appears in the above-identified patent and that said Letters Patent is hereby corrected as shown below:

in the specification at column 2, lines 20-21, "in which in which" should be --in which--;

at column 4, lines 19-20, "where it can the PTP MBMS services" should be --where it can get the PTP MBMS services--;

at column 5, line 10, "This measurement report would a report that is sent" should be --This measurement report would be a report that is sent--; and at column 8, line 55-56, "the sending the cell update message" should be --the sending of the cell update message--.

Signed and Sealed this
First Day of March, 2016

Michelle K. Lee
*Director of the United States Patent and Trademark Office*